United States Patent [19]
Miura

[11] Patent Number: 6,064,395
[45] Date of Patent: May 16, 2000

[54] APPARATUS AND METHOD OF SYNTHESIZING IMAGES

[75] Inventor: Katsuhiro Miura, Ichikawa, Japan

[73] Assignee: Namco, LTD., Tokyo, Japan

[21] Appl. No.: 08/996,201

[22] Filed: Dec. 22, 1997

[30] Foreign Application Priority Data

Dec. 27, 1996 [JP] Japan .................................. 8-359011

[51] Int. Cl.$^7$ .................................................. G06T 15/00
[52] U.S. Cl. .......................................... 345/430; 345/418
[58] Field of Search .................................... 345/418, 419, 345/421, 423, 425, 427, 430

[56] References Cited

U.S. PATENT DOCUMENTS

| | | |
|---|---|---|
| 5,493,636 | 2/1996 | Miller . |
| 5,553,208 | 9/1996 | Murata et al. . |
| 5,561,746 | 10/1996 | Murata et al. . |
| 5,621,867 | 4/1997 | Murata et al. . |

FOREIGN PATENT DOCUMENTS 2 266 425  10/1993  United Kingdom .
2 267 007  11/1993  United Kingdom .

OTHER PUBLICATIONS

"Computer Graphics Principles And Practice", by Foley et al., pp. 727–728; pp. 734–745.

*Primary Examiner*—Phu K. Nguyen
*Assistant Examiner*—Cliff N. Vo
*Attorney, Agent, or Firm*—Oliff & Berridge, PLC

[57] ABSTRACT

To provide an image synthesizing apparatus and method which can represent different feelings between various materials with less processing loads, the image synthesizing apparatus comprises a texture computing section for computing texture coordinates and a texture memory for storing texture information at the respective address locations specified by the texture coordinates. The texture information stored in the texture memory includes flags $CFL_I$, $CFL_T$, and $CFL_D$ for controlling the validity, invalidity or flow in the brightness, translucent or depth-cueing process and other flags $SFL_I$, $SFL_T$, and $SFL_D$ for changing parameters used for the brightness, translucent or depth-cueing process. Thus, a simple difference between color patterns as well as a difference between feelings of material can be represented with multiple texture mappings.

18 Claims, 9 Drawing Sheets

FIG. 5A

| SFL$_I$ | BRIGHTNESS |
|---------|------------|
| 0 0 | WHITE |
| 0 1 | RED |
| 1 0 | GREEN |
| 1 1 | BLUE |

FIG. 5B

| I$_{IN}$ | I$_{OUT}$ |
|------|-------|
| 0.5 | 0.6 |
| 0.6 | 0.7 |
| 0.7 | 0.8 |

| I$_{IN}$ | I$_{OUT}$ |
|------|-------|
| 0.5 | 0.7 |
| 0.6 | 0.8 |
| 0.7 | 0.9 |

- - - - - -

| I$_{IN}$ | I$_{OUT}$ |
|------|-------|
| 0.5 | 1.6 |
| 0.6 | 1.7 |
| 0.7 | 1.8 |

SELECTION BY SFL$_I$

FIG. 5C

| OP$_{IN}$ | OP$_{OUT}$ |
|------|-------|
| 0.0 | 0.1 |
| 0.1 | 0.2 |
| 0.2 | 0.3 |

| OP$_{IN}$ | OP$_{OUT}$ |
|------|-------|
| 0.0 | 0.2 |
| 0.1 | 0.3 |
| 0.2 | 0.4 |

- - - - - -

| OP$_{IN}$ | OP$_{OUT}$ |
|------|-------|
| 0.0 | 0.7 |
| 0.1 | 0.8 |
| 0.2 | 0.9 |

SELECTION BY SFL$_T$

| SFL_D | TARGET COLOR |
|---|---|
| 0 0 | WHITE |
| 0 1 | RED |
| 1 0 | GREEN |
| 1 1 | BLUE |

| DP_IN | DP_OUT |
|---|---|
| 0.0 | 0.00 |
| 0.1 | 0.09 |
| 0.2 | 0.18 |
| ⋮ | ⋮ |

| DP_IN | DP_OUT |
|---|---|
| 0.0 | 0.0 |
| 0.1 | 0.08 |
| 0.2 | 0.16 |
| ⋮ | ⋮ |

– – – – – –

| DP_IN | DP_OUT |
|---|---|
| 0.0 | 0.0 |
| 0.1 | 0.01 |
| 0.2 | 0.02 |
| ⋮ | ⋮ |

SELECTION BY SFL_D

APPARATUS AND METHOD OF SYNTHESIZING IMAGES

BACKGROUND OF THE INVENTION

1. Field of Industrial Application

The present invention relates to an apparatus and method of synthesizing an image through a texture mapping procedure.

2. Description of the Prior Art

There are known a variety of image synthesizing systems which can be used in game machines, image generating tools and the like. Such image synthesizing systems have a great technical subject with respect to how the quality of image can be improved to realize a so-called virtual reality. One of the known techniques for improving the quality of image is a technique called "texture mapping".

In the texture mapping, texture information is previously stored in a texture memory at its address locations. A given procedure is then carried out to determine texture coordinates of an object to be mapped at each pixel location. Based on these texture coordinates, the texture information is read from the texture memory to provide an image to be displayed. Thus, the texture mapping can represent an object with various textures, resulting in improvement of the image quality.

However, the prior art texture mapping can only represent differences in color and the like on the surface of the object. This raises a problem in that differences in material cannot be sufficiently represented.

There is a technique that represents the differences in material by setting information of brightness (illumination), translucence and the like for each object such as polygon (primitive surface) However, such a technique can only control the brightness and translucent information for each polygon. In order to set different brightness and translucent information at the first and second portions of a polygon, therefore, that polygon must be divided into separate polygon portions respectively corresponding to the first and second polygon portions. This increases the number of polygons to be processed.

There is also conceivable another technique that information of translucence or the like is stored in a texture memory at the respective address locations to represent the feeling of translucence in an object such as a polygon. However, when such a technique is to be used to provide different feelings of translucence between the first and second polygons, it is necessary to provide different texture information respectively for the first and second polygons. This increases the capacity of the texture memory and the processing load for writing and reading the texture information.

SUMMARY OF THE INVENTION

The present invention is directed to overcome the above-mentioned technical problems in the prior art. An object of the present invention is therefore to provide an image synthesizing apparatus and method which can represent various feelings of different materials with a reduced scale of hardware and a reduced processing load.

To this end, the present invention provides an image synthesizing apparatus using a texture mapping, comprising:

means for computing texture coordinates which specify information of a texture to be mapped on an object; and means for storing the texture information at the address locations specified by the texture coordinates; and wherein the texture information storing means stores the texture information including a process control flag for controlling at least one of validity, invalidity and flow in at least one given process carried out based on the texture information.

According to this aspect of the present invention, the texture information is read out from the texture information storing means based on the texture coordinates from the texture coordinates computing means. This texture information includes the process control flag. The validity, invalidity or flow in the given process is controlled based on this process control flag. Thus, the variability in the feeling of material of the object can be improved. At the same time, the same object can have both portions subjected to and not subjected to the given process. Consequently, an image improved in quality can be obtained with a reduced scale of hardware and a reduced processing load by using the image synthesizing system.

In addition to the color information and process control flag, the texture information stored in the texture information storing means may include various other information such as translucent information, brightness information, surface shape information (surface normal information and displacement information), reflectance information, index of refraction information, and depth information.

The given process of the image synthesizing apparatus may be at least one of a brightness process, translucent process and depth-cueing process; and wherein the process control flag is a flag for controlling the validity, invalidity and flow in at least one of the brightness process, the translucent process and the depth-cueing process.

The same object can have both portions subjected to and not subjected to the brightness, translucent or depth-cueing process. Further, the same object can have a portion subjected to a first type of brightness, translucent or depth-cueing process and another portion subjected to a second type of brightness, translucent or depth-cueing process. This improves the quality of image.

The present invention further provides an image synthesizing apparatus using a texture mapping, comprising:

means for computing texture coordinates which specify information of a texture to be mapped on an object; and means for storing the texture information at the address locations specified by the texture coordinates; and wherein the texture information storing means stores the texture information including a parameter switching flag for switching a parameter used in at least one given process which is performed based on the texture information.

According to the present invention, the texture information include the parameter switching flag which is used to switch the parameter used in the given process. Thus, the variability in the feeling of material of the object can be improved and at the same time, the setting of the parameter can be varied in the same object. For example, even if an object has invariable color information, the difference in the feeling of material can be represented by changing the parameter used in various processing such as the brightness, translucent, or depth-cueing process. In this case, it is conceivable to use a technique for changing the setting of the parameter for each object in order to vary the feeling of material of the objects. However, the just-mentioned technique requires to divide one object into a plurality of object parts and to set the parameter for each divided object part.

This leads to increase of the hardware scale and processing load. On the other hand, the present invention can improve the variability in the feeling of material with a reduced scale of hardware and a reduced processing load.

The image synthesizing apparatus of the present invention may further comprise a table for switching the parameter based on the parameter switching flag and for outputting the switched parameter toward processing means which performs the given process.

With provision of such a table, the parameter can be switched more flexibly and the parameter switching process can be simplified.

The given process of the image synthesizing apparatus may be a brightness process, and the parameter switching flag may be a flag for switching at least one of brightness and light-source parameters used for the brightness process.

Thus, one and the same object can have both portions having different settings of the brightness and light-source parameters. Consequently, one and the same object can be displayed as if having portions with different feelings of material even though it is mapped with one and the same color pattern or the like.

The given process of the image synthesizing apparatus may be a translucent process, and the parameter switching flag may be a flag for switching the translucent parameter used in the translucent process.

Thus, one and the same object can have both opaque and translucent (or transparent) portions. This increases the variety of images that can be represented by the image synthesizing apparatus.

The given process of the image synthesizing apparatus may be a depth-cueing process, and the parameter switching flag may be a flag for switching at least one of depth and target-color parameters used in the depth-cueing process.

Thus, one and the same object can have both portions having different representations by the depth-cueing process. This increases the variety of images that can be represented by the image synthesizing apparatus.

BRIEF DESCRIPTION OF THE DRAWINGS

FIGS. 5A, 5B and 5C illustrate techniques of changing the parameter in the brightness and translucent processes.

DETAILED DESCRIPTION OF THE PREFERRED EMBODIMENT

One embodiment of the present invention will now be described with reference to the drawings.

Figure 1A:
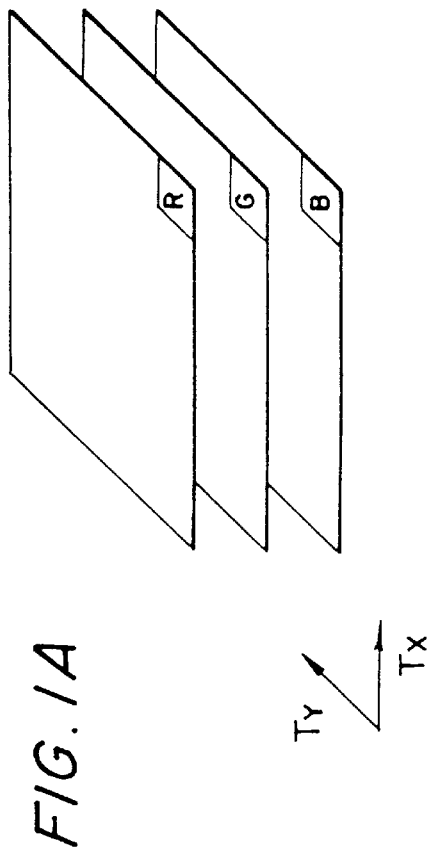
FIGS. 1A and 1B illustrate the principle of the present invention.
Figure 1B:
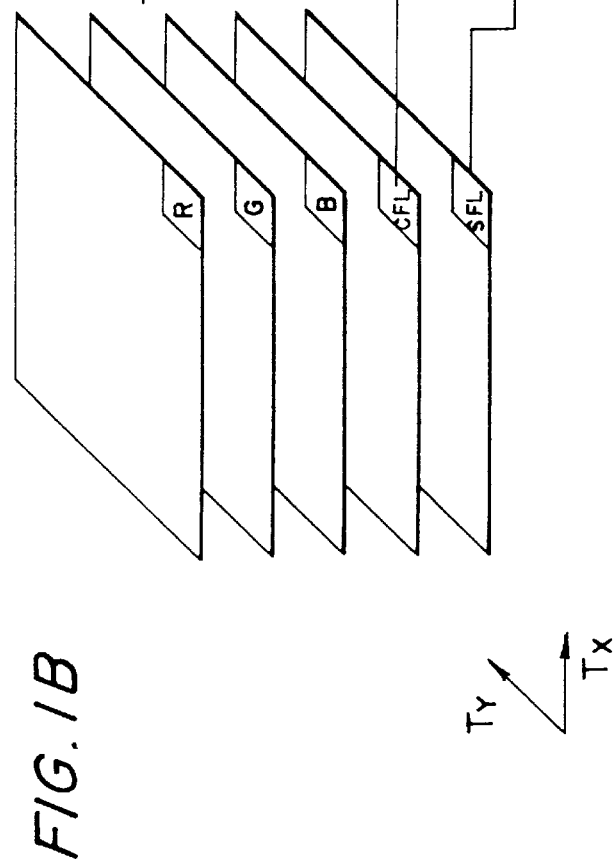

Referring now to FIGS. 1A and 1B, the principle of the present embodiment will be described.

AS shown in FIG. 1, in the conventional texture mapping, texture information including color information R, G, B and others is stored in a texture memory (texture information storing means) at the respective address locations that are specified by texture coordinates $T_X$, $T_Y$. This color information and others with various parameters are used to perform the brightness, translucent and depth-cueing process for obtaining the information of an image to be displayed.

However, such a technique as shown in FIG. 1A can control the contents of the brightness, translucent and depth-cueing process only for each object to be displayed, such as each polygon to be displayed. In such a technique, therefore, It is required to subdivide the polygon so that the same polygon can be subjected to different contents of the process. This increases the processing load. Furthermore, in addition to the color information, there is a technique that stores translucent information and the like in the texture memory at the respective address locations. However, the last-mentioned technique requires separate texture information for each to object in order to provide different feelings of translucence in the same object. This also increases the memory capacity.

As shown in FIG. 1B, therefore, the present embodiment stores texture information including a process control flag CFL and a parameter switching flag SFL in the texture memory is at the respective address locations that are specified by the texture coordinates $T_X$, $T_Y$. The process control flags CFL are used to control the validity, invalidity or flow in the process of brightness, translucence or depth-cueing while the parameter switching flags SFL are used to switch the parameter used in the process of brightness, translucent or depth-cueing. Thus, various different feelings of material for the object can be represented with reduced hardware scale and processing load.

Figure 2:
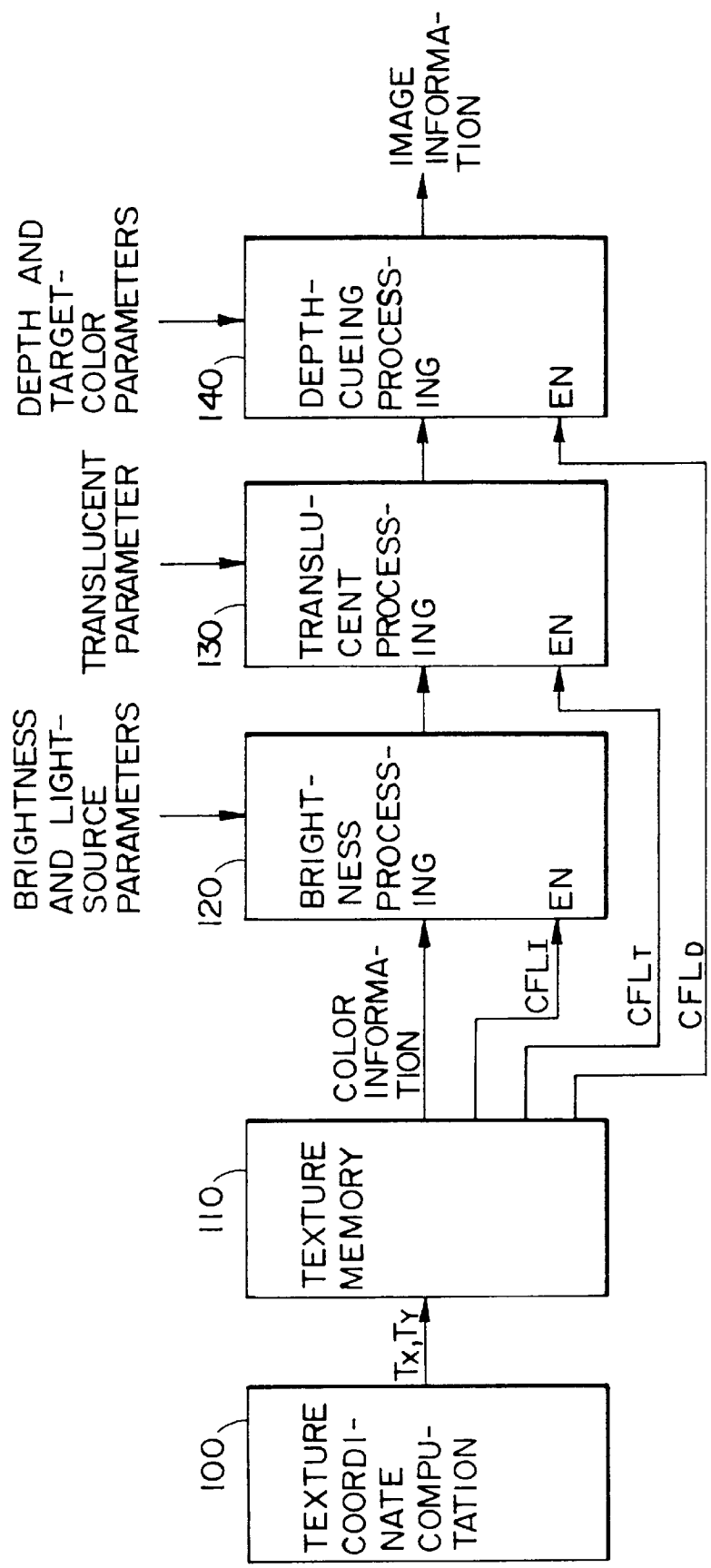
FIG. 2 is a functional block diagram of one embodiment of the present invention when the validity, invalidity or flow in a process is controlled.

FIG. 2 shows a functional block diagram of an image synthesizing apparatus when the process control flags CFL are used to control the validity, invalidity or flow in various processes.

A texture coordinate computing section 100 computes texture coordinates $T_X$, $T_Y$ which specify the information of a texture mapped onto the object. The function of the texture coordinate computing section 100 is performed by hardware such as an custom IC, CPU or DSP. With image synthesization using polygons, the texture coordinate computing section 100 uses vertex texture coordinates given to each vertex in a polygon to compute and determine the texture coordinates of the pixel locations in the polygon. At this time, for example, a process of correcting a distortion due to the perspective transformation may be carried out with various other processes.

The texture memory (texture information storing means) 110 stores the texture information including the process control flags CFL at the respective address locations specified by the texture coordinates. This function can be performed by hardware such as RAM and ROM.

In addition to the color information and control flag, the texture information may include various other information such as translucent information, brightness information, surface shape information (including surface normal information and displacement information), reflectance information, index of refraction information and depth information.

A brightness processing section 120 uses a brightness parameter, a light-source parameter, color information (R, G, and B) from the texture memory 110 and the like for determining the brightness of the respective pixels on the display screen. The color information R, G and B are used to determine the ratio of red-color, green-color and blue-color components in the brightness while the brightness parameter is used to determine the entire magnification of brightness. When the color (R, G and B) is equal to another pixel and a larger magnification is set by the brightness Parameter than that of the other pixel, therefore, a color having the same hue and a higher lightness can be obtained. The light-source parameter determines the color of a light source or the like. When the light source color determined by the light-source parameter is red, for example, an object having its white-colored surface will be colored by red. When an object is represented by a polygon, the brightness and surface normal vector given to each vertex of the polygon can be used to perform the Gouraud shading or Phong shading for determining the brightness parameter at the corresponding pixel location of the polygon.

A translucent processing section 130 uses the color information obtained after the brightness processing and a translucent parameter for performing the translucent process. Transparency, opacity or the like may be used as the translucent parameter. Here, the example that an opacity is used as Various translucent processings can be performed in the translucent processing section 130. For example, a blend technique will perform the translucent process as follows:

$$R_q = OP_1 \times R_T + (1 - OP_1) \times R_X$$

$$G_q = OP_1 \times G_T + (1 - OP_1) \times G_X$$

$$B_q = OP_1 \times B_T + (1 - OP_1) \times B_X$$

where $OP_1$, is an opacity in the blend technique; $R_T$, $G_T$ and $B_T$ are color information of a translucent polygon; $R_X$, $G_X$ and $B_X$ are color information of the background; and $R_Q$, $G_Q$ and $B_Q$ are color information obtained in the translucent process. The value of $OP_1$, for R, $OP_1$ for G, and $OP_1$ for B can be different from each other.

The filtering technique provides the following formulas:
$$R_Q = OP_2 \times F_R \times R_X$$
$$G_Q = OP_2 \times F_G \times G_X$$
$$B_Q = OP_2 \times F_B \times B_X$$

where $OP_2$ is an opacity in the filtering technique; and $F_R$, $F_G$ and $F_B$ are filter coefficients of the translucent polygon.

A depth-cueing processing section 140 performs the depth-cueing process based on color information obtained after the brightness and translucent processings, a depth parameter and a target color parameter. More particularly, the process is performed such that the displayed color of the object is approximating to the target color as the object is becoming farther from the viewpoint.

In the present embodiment, process control flags included in the texture information that is stored in the texture memory 110 is used to control the validity, invalidity or flow of the brightness, translucent or depth-cueing process. More particularly, as shown in FIG. 2, process control flags $CFL_I$, $CFL_T$ and $CFL_D$ are used to control the validity, invalidity or flow in the brightness, translucent and depth-cueing processing sections (120, 130 and 140), respectively.

Figure 3A:
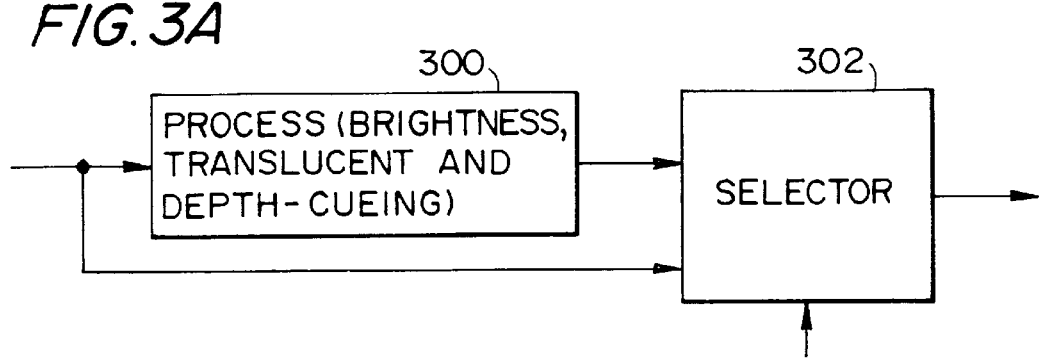
FIGS. 3A, 3B, 3C and 3D illustrate techniques of controlling the validity, invalidity or flow in the process.

There are various techniques that control the validity, invalidity or flow in the process. For example, as shown in FIG. 3A, a selector 302 selects either the output of the process 300 (brightness, translucent or depth-cueing) or a signal bypassed the process 300. For example, when a control flag CFL=1, the output of the process 300 will be selected by the selector 302. And when CFL=0, the signal bypassed the process 300 will be selected by the selector 302. In other words, the process 300 becomes valid with CFL=0 and invalid with CFL=1. Thus, for example, single and the same polygon can have both parts that are valid and invalid for the brightness, translucent or depth-cueing process.

Figure 3B:
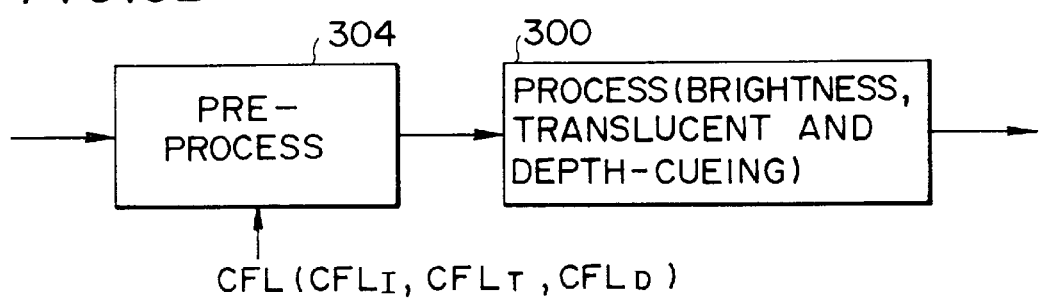

FIG. 3B shows a case in which a pre-process 304 is carried out prior to the process 300 and then said pre-process 304 controls the validity, invalidity or flow in the process 300. If the process 300 is the brightness process and $CFL_I=1$, for example, the brightness process is performed at a brightness magnification set by the brightness parameter. On the other hand, when $CFL_I=0$, the brightness magnification is fixed to 1 time regardless of the brightness Parameter, resulting in the brightness process is made to invalid.

When the process 300 is the translucent process and $CFL_T=1$, the translucent process is carried out based on an opacity and the like set by the translucent parameter. On the other hand, when $CFL_T=0$, the opacity is fixed to 1, resulting in the translucent process is made to invalid.

When the process 300 is the depth-cueing process, the validity or invalidity in the process is controlled, for example, by setting a target color same as the input color.

The technique of FIG. 3A requires means or selector 302 in order to adjust the timing between outputting the process 300 and bypassing the process 300. This leads to a problem of an increased hardware scale and a complicated control. However, the technique of FIG. 3B can overcome these problems.

Figure 3C:
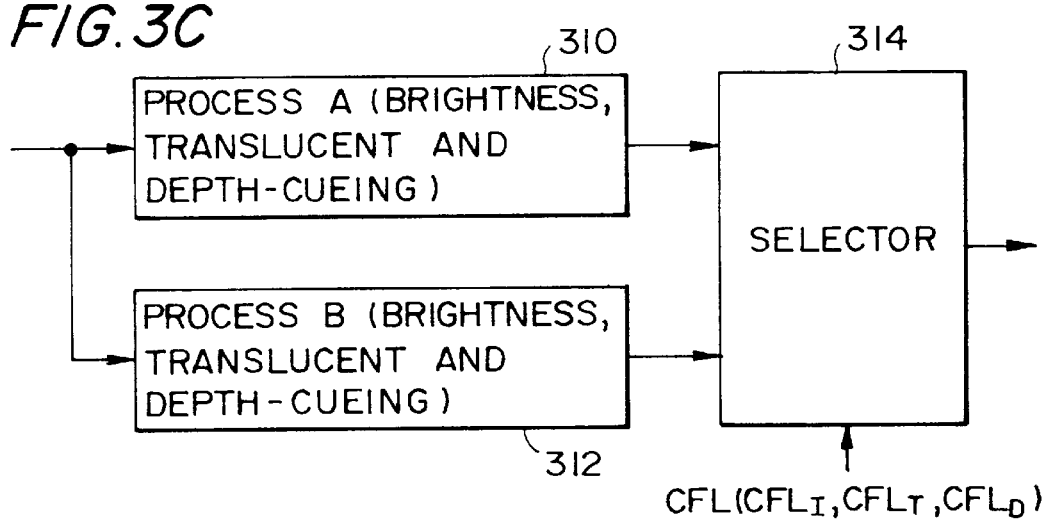

FIG. 3C shows a case in which either of a process A 310 or process B 312 is selected by a selector 314 based on the control flag CFL. With the translucent process, the process A 310 is the translucent process based on the aforementioned blend technique while the process B 312 is the translucent process based on the filtering technique. Thus, according to the present embodiment, the flow in the process can be controlled by using the control flag CFL.

Figure 3D:
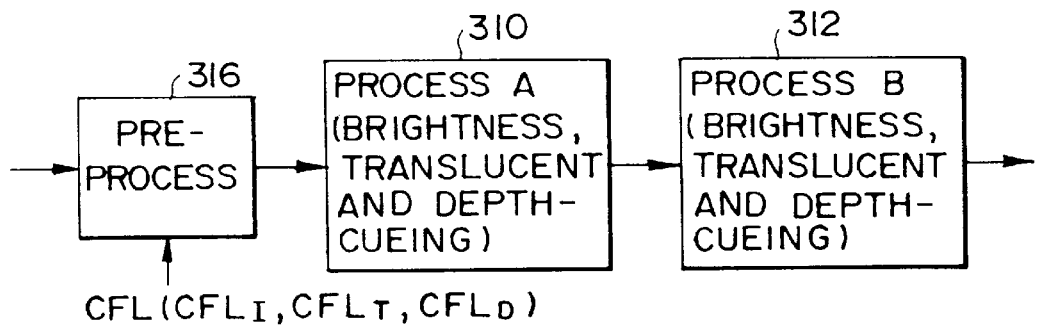

As shown in FIG. 3D, the selector 314 of FIG. 3C may be replaced by a pre-process 316 to be carried out prior to the processes A 310 and process B 312. In other words, the control flag CFL may be used to perform the pre-process for controlling the validity, invalidity or flow in the process A 310 and process B 312.

Figure 4:
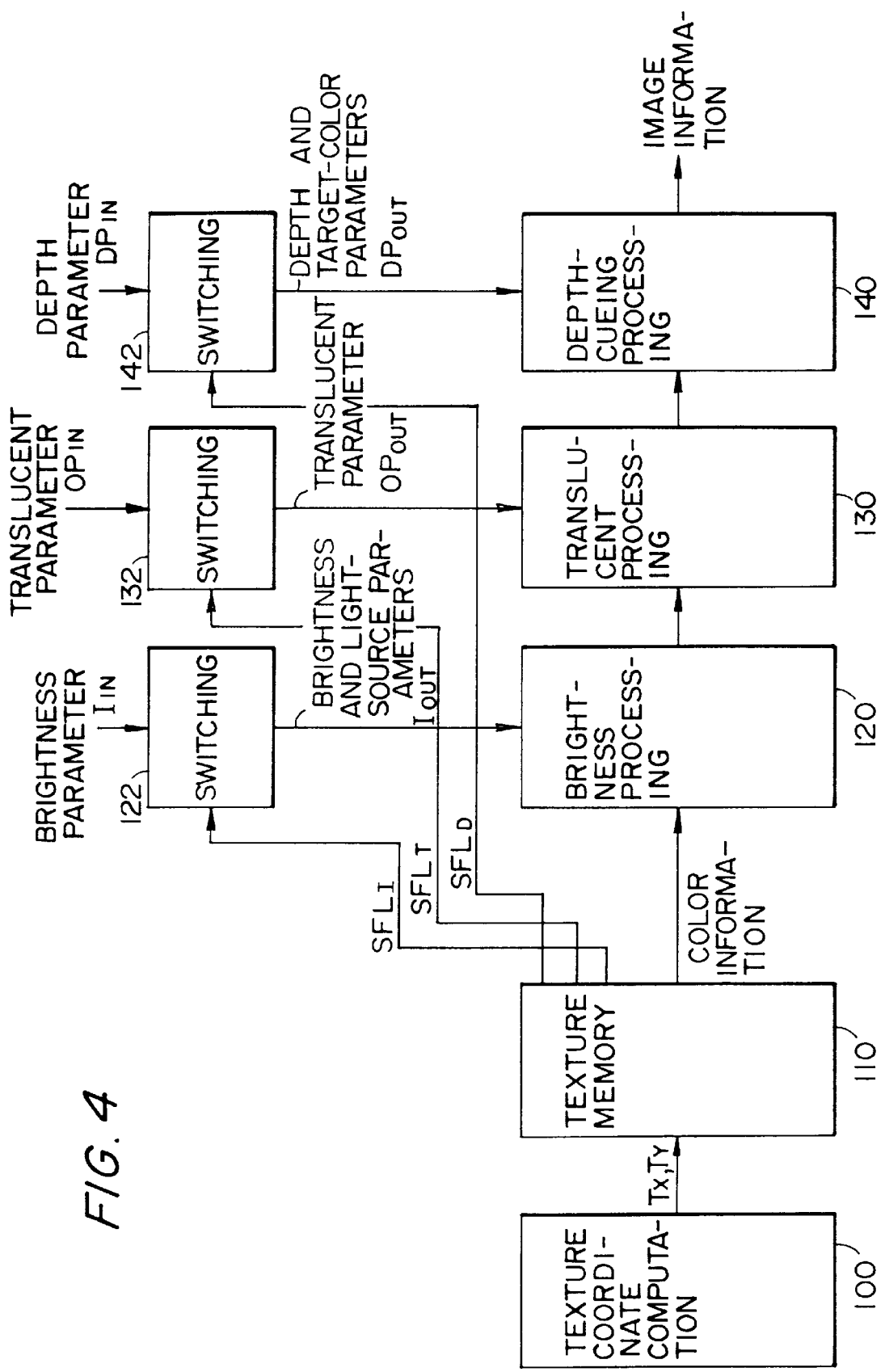
FIG. 4 is a functional block diagram of the embodiment shown in FIG. 2 when a parameter used in the process is changed.

FIG. 4 shows a functional block diagram of an image synthesizing apparatus when parameters used in various processes are switched based on the switching flags SFL.

As will be apparent from comparison with FIG. 2, FIG. 4 shows switching sections 122, 132 and 142 which switch the parameters based on switching flag $SFL_I$, $SFL_T$ and $SFL_D$. The switching section 122 switches the brightness and light-source parameters; the switching section 132 switches the translucent parameter; and the switching section 142 switches the depth and target-color parameters. The switched parameter is outputted toward the brightness processing section 120, translucent processing section 130 or depth-cueing processing section 140.

It is desirable that each of the switching sections 122, 132 and 142 uses a table for outputting the switched parameter based on the switching flag SFL. For example, the switching section 122 may use such a table as shown in FIGS. 5A and 5B. In FIG. 5A, the color of the light source is switched based on the switching flag $SFL_I$. Thus, an object such as a polygon can have different feelings of material by switching the color of the light source even if the object is mapped with the same color pattern or the like. Further, the present embodiment can synthesize a highly detailed image with small number of polygons since different light-source colors can be set at the first and second portions of the polygon respectively.

Although FIG. 5A shows two-bit switching flag $SFL_I$, it may be of one bit or three or more bits.

In FIG. 5B, one of tables for transforming an input brightness parameter $I_{In}$ into $I_{out}$ is selected based on the switching flag $SFL_I$. Thus, an object such as a polygon can be displayed as if it has different lightnesses, even though the polygon has the same brightness parameter. In addition, the present embodiment can change the setting of brightness in each of the first and second polygon portions in the same polygon.

The switching section 132 uses such a table as shown in FIG. 5C. In other words, one of tables for transforming an input translucent parameter $OP_{IN}$, into $OP_{out}$ is selected based on the switching flag $SFL_T$. Thus, an object can be displayed as if it has different colors, even though the object is mapped with the same color pattern or the like. At the same time, the setting of translucent parameter can be varied at each portion of the object. The translucent parameter $OP_{IN}$ to be input to the switching section 132 may be stored in the texture memory 110 together with the color information, control flags, switching flags and the like.

Figures 6A, 6B, 6C:
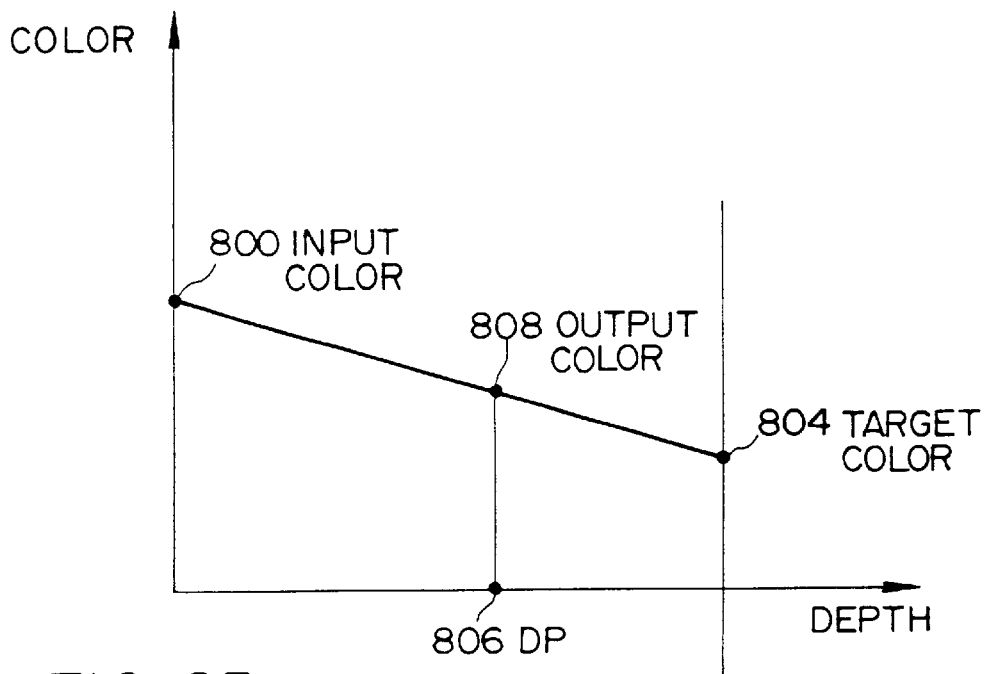
FIGS. 6A, 6B and 6C illustrate techniques of changing the parameter in the depth-cueing process.

The depth-cueing process interpolates an input color 800 and target color 804 using a depth parameter DP 806 for providing an output color 808, as shown in FIG. 6A. Thus, the color of an object can be approximating to the target color 804 as the object becomes farther from the viewpoint. This enables the blending of the horizon to the sky, the fog or the smoke to be represented by the image synthesizing apparatus. The switching section 142 uses such a table as shown in FIGS. 6B and 6C. In FIG. 6B, target color 804 is switched based on the switching flag $SFL_D$. In FIG. 6C, one of tables for transforming an input depth parameter $DP_{IN}$ into $DP_{OUT}$ is selected based on the switching flag $SFL_D$. Thus, an object can be displayed as if it has different colors, even though the object is mapped with the same color pattern or the like. At the same time, the settings of target-color and depth parameters can be varied at each portions of the object.

An image generated according to the present embodiment will now be described.

Figure 7A:
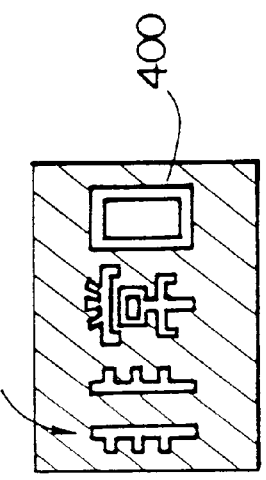
FIGS. 7A and 7B exemplify an image obtained according to the present embodiment.
Figure 7B:
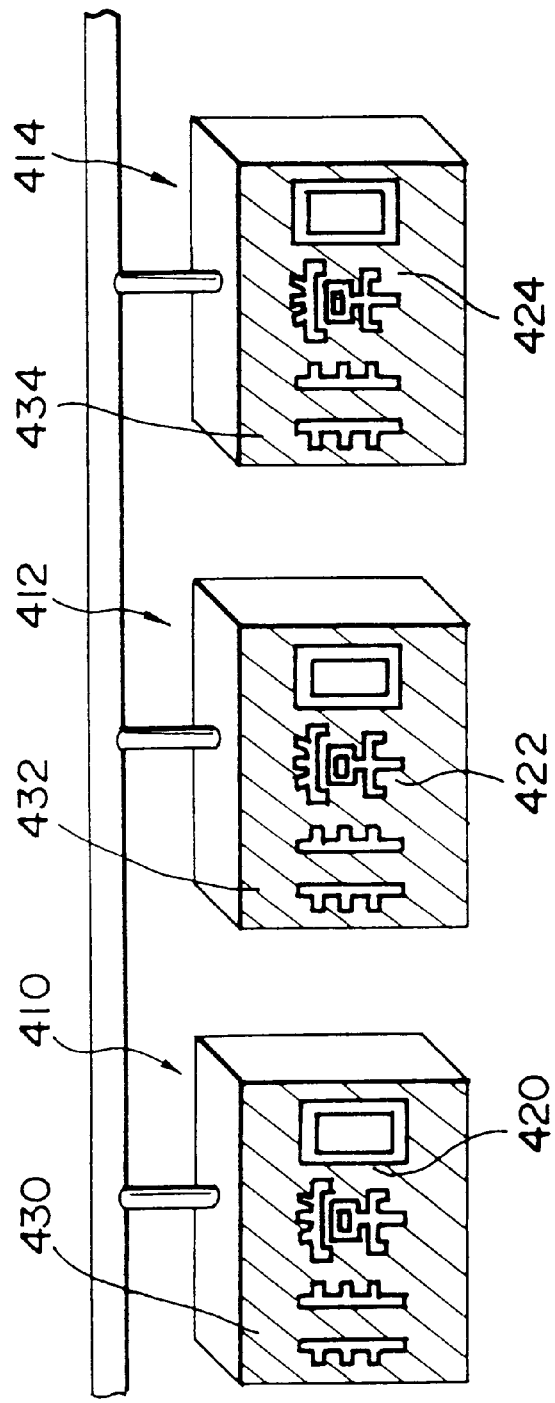

For example, a texture having such a color pattern as shown in FIG. 7A is first provided. This texture includes white-colored characters 400 and a deep-green-colored background 402. As shown in FIG. 7B, the texture is mapped to the front face of each of signboards 410, 412 and 414. At this time, for example, the present embodiment may make the brightness process control flag $CFL_I$ equal to zero for rendering the brightness process invalid with respect to backgrounds 430, 432 and 434. On the other hand, the brightness process control flag $CFL_I$ may be equal to one for rendering the brightness process valid with respect to characters 420, 422 and 424. With respect to the signboards 410, 412 and 414, the brightness process switching flag $SFL_I$ is set so that the brightness parameters become 1, 1.5 and 2 times and the light-source parameters are respectively white, red and blue. Thus, all the backgrounds 430, 432 and 434 will have the same color and the same lightness. On the other hand, the character 420 will be white-colored with the normal lightness; the character 422 will be red-colored with a lightness higher than that of the character 420; and the character 424 will be blue-colored with a further higher lightness. In other words, the present embodiment can represent different feelings of material using the texture having the same color pattern.

The conventional techniques can only set the brightness for each polygon. In order to realize the representation as shown in FIG. 7B, various kinds of exclusive textures must be provided corresponding to the respective signboards 410, 412 and 414. This leads to increase of the memory capacity and processing load. The present embodiment can provide the representation as shown in FIG. 7B merely by changing the control flag CFL and switching flag SFL or the interpretation of these flags without changing the color pattern parts. Therefore, the present embodiment can synthesize a variety of high-quality images with reduced hardware scale and processing load.

If the control flag CFL and switching flag SFL are to be changed, it may be performed by re-writing the contents of the texture memory or by changing the output from the texture memory.

In addition, these flags CFL and SFL may be changed for each object or changed with passage of time.

The flags CFL and SFL are not necessarily changed. For example, the brightness process relating to the backgrounds may be made invalid with CFL=0 while the brightness process relating to the characters may be made valid with SFL=1. Consequently, the brightness process may provide an image in which only the characters have a given color and a variable lightness.

Figure 8A:
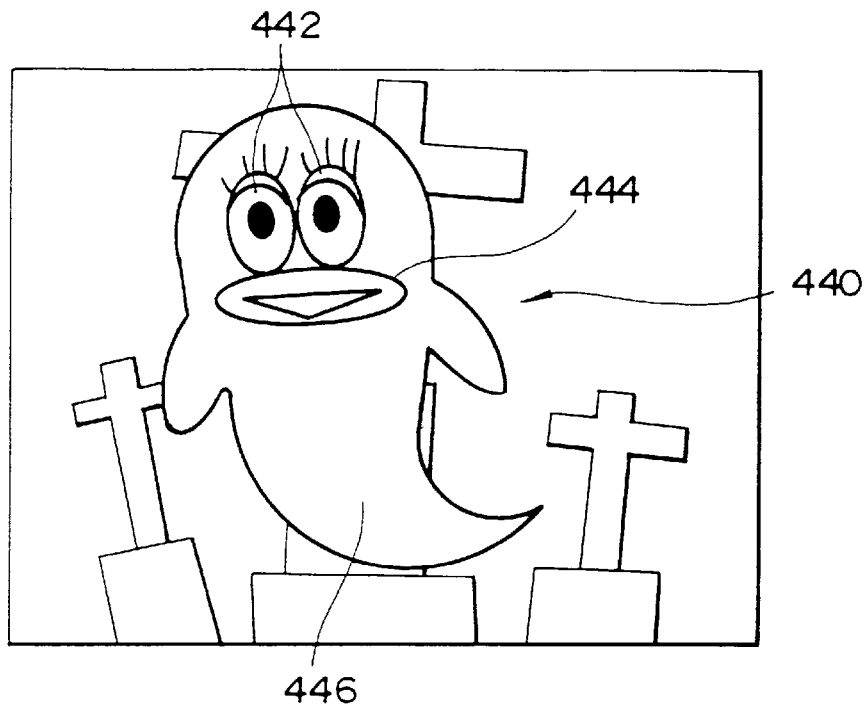
FIGS. 8A and 8B exemplify another image obtained according to the present embodiment.
Figure 8B:
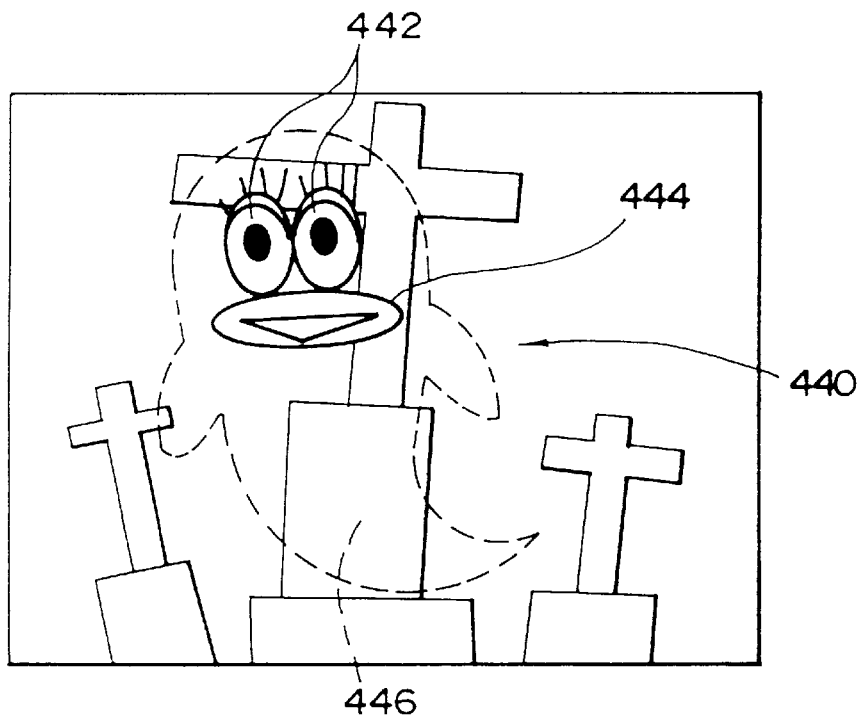

FIGS. 8A and 8B show a case in which a game character 440 representing a ghost is displayed, its eyes 442 and mouth 444 being invalid in the translucent process with the translucent process control flag $CFL_T=0$ and its body 446 being valid in the translucent process with $CFL_T 1$. When the translucent parameter on the entire game character 440 is changed, the game character 440 can be displayed with the eyes 442 and mouth 444 remaining opaque and with the body 446 being changed to be translucent, as shown in FIG. 8B. In other words, a part of the object can be retained opaque while the other part thereof can be translucent. To attain such a representation, the conventional techniques require providing different objects such as polygons for the eyes 442 and mouth 444 separate from those of the body 446. However, the present embodiment can provide such a representation as shown in FIGS. 8A and 8B without providing any separate and different objects for the eyes 442, mouth 444 and body 446.

The switching flag $SFL_T$ may be used to provide such an image representation as shown in FIGS. 5A and 8B. In this case, the translucent process becomes valid with $CFL_T=1$ with respect to all the eyes 442, mouth 444 and body 446. However, the switching flag $SFL_T$ will be set such that the body 446 has an increased rate of translucent parameter change with time while the eyes 442 and mouth 444 have a reduced rate of translucent parameter change with time. This can be realized, for example, by selecting a table for the body 446 such that the rate of translucent parameter change with time is increased (see FIG. 5C) and another table for the eyes 442 and mouth 444 such that the rate of translucent parameter change with time is reduced.

Figure 9A:
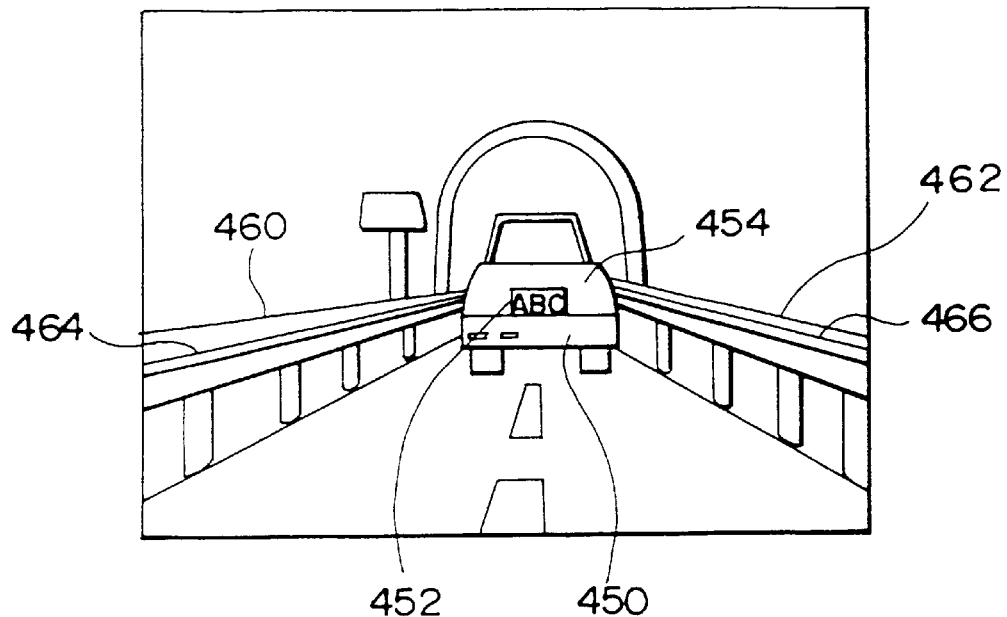
FIGS. 9A and 9B exemplify a further image obtained according to the present embodiment.
Figure 9B:
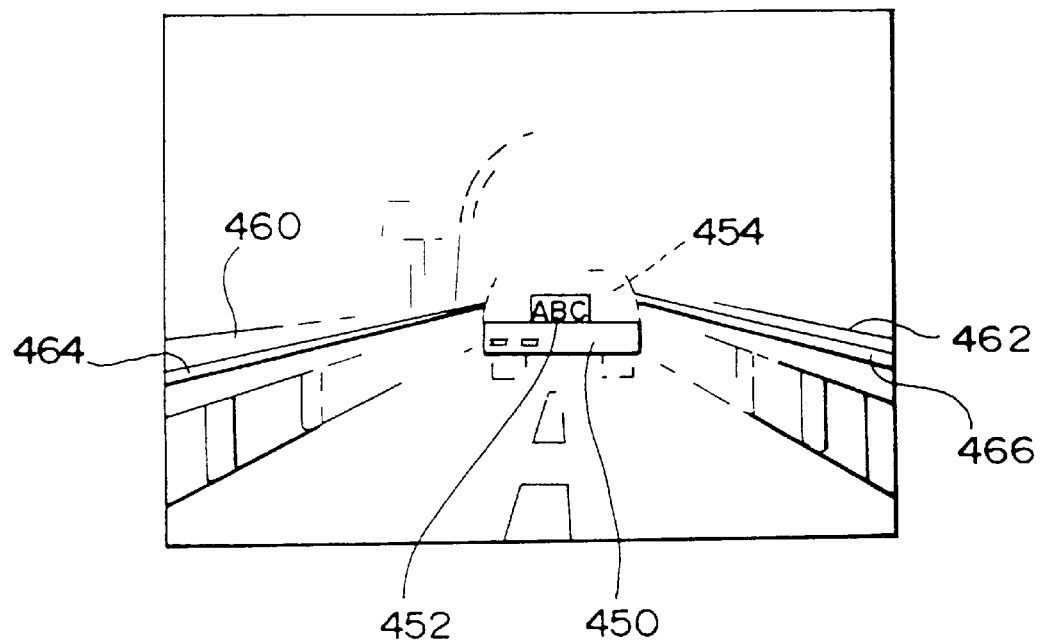

In FIGS. 9A and 9B, the switching flag $SFL_D$ is set such that the bumper 450 and license plate 452 of an automobile have a reduced depth-cueing effect, while the other part or rearward part 454 thereof having an increased depth-cueing effect. Thus, as shown in FIG. 9B, such a representation that only the bumper 450 and license plate 452 are visible while the rearward automobile part 454 is getting invisible covered with fog can be performed by the image synthesizing system. Thus, the difference in the feeling of material between the bumper and license plate 450, 452 and the rearward automobile part 454 can be represented.

It is now assumed that the fog is white-colored and the automobile parts including the bumper 450, license plate 452 and rearward part 454 are blue-colored. When the depth-cueing process is carried out, the blue color in the bumper 450, license plate 452 and rearward part 454 is changed to white color as the automobile moves farther from the viewpoint. Thus, such an effect that the blue-colored automobile is misted by the white-colored fog, as shown in FIG. 9B. However, it may be desirable that the bumper 450 and license plate 452 having the same blue color as that of the rearward automobile part 454 provide a different feeling of material such as glistening. It may be also desirable that in a racing game, a player can see a target chased by that player. In such a case, it is not preferred that all the bumper 450, license plate 452 and rearward automobile part 454 are vanished by the depth-cueing process. It is desirable that the bumper 450 and license plate 452 have a different feeling of material from the rearward automobile part 454, in spite of having the same blue color as that of the rearward automobile part 454, so that the bumper 450 and license plate 452 will not be vanished from the player's field of view.

To perform such a representation through the conventional technique, it is required to form the bumper 450 and license plate 452 of different objects such as polygons from that of the rearward automobile part 454. The present embodiment can perform such a representation as shown in FIGS. 9A and 9B without providing different objects for the bumper 450 and license plate 452 from the rearward automobile part 454. More particularly, the rearward automobile part 454 is misted and vanished by the tog through the depth-cueing process while the bumper 450 and license plate 452 are subjected to a reduced depth-cueing effect through the setting of the switching flag $SFL_D$ without being immediately vanished from the player's field of view.

Similarly, FIG. 9A shows yellow-colored guardrails 460 and 462 with yellow-colored lines 464 and 466. The guardrails 460, 462 and lines 464, 466 are represented by the use of a single and the same texture. When the depth-cueing process is carried out, yellow color approaches white color. Therefore, the guardrails 460 and 462 will be misted by the fog, as shown in FIG. 9B. On the other hand, the lines 464 and 466 are subjected to the reduced depth-cueing effect through the setting of the switching flag $SFL_D$. Thus, these lines will not be immediately vanished from the player's field of view Consequently, the player can see and grasp the racing course through the lines 464 and 466 while viewing the automobiles and guardrails misted by the fog. This can facilitate the operability in the game.

The present invention is not limited to the aforementioned embodiment, but may be embodied in any of various other forms.

For example, aforementioned the embodiment of the present invention has been described as to the brightness, translucent and depth-cueing processes for controlling the validity, invalidity or flow or for switching the parameters used therein. The present invention is particularly effective for these processes, but may be applied to any of various other processes such as a flare process for representing the diffusion or diffraction of an intense light.

Although the present embodiment has been described as to the common color pattern with the setting of the control and switching flags being varied. But in the present invention the texture information may contain brightness information, translucent information, surface shape information, reflectance information, index of retraction information, depth information and the like and at least one of these information can have the same content while the setting of the control and switching flags being varied. For example, it is now assumed that a plastic material having its uniform reflecting direction has a feeling of material different from that of a metal having a more intense reflection in a particular direction. In such case, there are provided a reflectance table for a plastic which equalizes the reflecting direction and another reflectance table for a metal which causes a more intense reflection in a particular direction. These tables may be switched from one to another by the use of switching flag and the like to represent different feelings of material with the same color or other information.

Particularly effective techniques for controlling the validity, invalidity or flow in the process and for switching the parameters used in the process are shown in FIGS. 3A to 3C, 5A to 5C and 6A to 6C. However, any of various other techniques may be applied to the present invention.

The present invention is particularly effective for the image synthesization of the three-dimensional object represented by primitive surfaces (e.g., polygons, free-form surfaces and the like). However, the present invention may be similarly applied to any of various other image synthesis techniques.

The texture mapping used in the present invention is intended to be a broad texture mapping including not only a picture mapping but also a bump mapping and displacement mapping and other mappings.

What is claimed is:

1. An image synthesizing apparatus using a texture mapping, comprising;

means for computing texture coordinates which specify information of a texture to be mapped on an object; and means for storing the texture information, wherein said texture information includes a process control flag for controlling at least one given process carried out based on said texture information.

2. The image synthesizing apparatus according to claim 1;

wherein said given process is at least one of a brightness process, translucent process and depth-cueing process; and wherein said process control flag is a flag for controlling the validity, invalidity and flow in at least one of said brightness process, said translucent process and said depth-cueing process.

3. An image synthesizing apparatus using a texture mapping, comprising:

means for computing texture coordinates which specify information of a texture to be mapped on an object; and means for storing the texture information, wherein said texture information includes a parameter switching flag for switching a parameter used in at least one given process which is performed based on said texture information.

4. The image synthesizing apparatus according to claim 3, further comprising a table for switching the parameter based on said parameter switching flag and for outputting the switched parameter toward processing means which performs said given process.

5. The image synthesizing apparatus according to claim 3:

wherein said given process is a brightness process; and wherein said parameter switching flag is a flag for switching at least one of brightness and light-source parameters used for said brightness process.

6. The image synthesizing apparatus according to claim 3:

wherein said given process is a translucent process; and wherein said parameter switching flag is a flag for switching the translucent parameter used in said translucent process.

7. The image synthesizing apparatus according to claim 3:

wherein said given process is a depth-cueing process; and wherein said parameter switching flag is a flag for switching at least one of depth and target-color parameters used in said depth-cueing process.

8. An image synthesizing method for performing a texture mapping, comprising the steps of:

computing texture coordinates for specifying information of a texture to be mapped on an object; and reading the texture information from texture information storing means, wherein said texture information includes a process control flag for controlling at least one given process carried out based on said texture information.

9. An image synthesizing method for performing a texture mapping, comprising the steps of:

computing texture coordinates for specifying information of a texture to be mapped on an object; and reading the texture information from texture information storing means, wherein said texture information includes a parameter switching flag for switching a parameter used in at least one given process which is performed based on said texture information.

10. An image synthesizing apparatus using a texture mapping, comprising:

a computing section that computes texture coordinates which specify information of a texture to be mapped on an object; and a memory that stores the texture information, wherein said texture information includes a process control flag for controlling at least one given process carried out based on said texture information.

11. The image synthesizing apparatus of claim 10, wherein said given process is at least one of a brightness process, translucent process and depth cueing process; and wherein said process control flag is a flag for controlling at least one of said brightness process, said translucent process and said depth-cueing process.

12. An image synthesizing apparatus using a texture mapping, comprising:

a computing section that computes texture coordinates which specify information of a texture to be mapped on an object; and a memory that stores the texture information, wherein said texture information includes a parameter switching flag for switching a parameter used in at least one given process which is performed based on said texture information.

13. The image synthesizing apparatus of claim 12, wherein said memory further stores a table for switching the parameter based on said parameter switching flag and for outputting the switched parameter toward a processing means which performs said given process.

14. The image synthesizing apparatus of claim 12, wherein said given process is a brightness process and wherein said parameter switching flag is a flag for switching at least one of brightness and light-source parameters used for said brightness process.

15. The image synthesizing apparatus of claim 12, wherein said given process is a translucent process; and wherein said parameter switching flag is a flag for switching the translucent parameter used in said translucent process.

16. The image synthesizing apparatus of claim 12, wherein said given process is a depth-cueing process; and wherein said parameter switching flag is a flag for switching at least one of depth and target-color parameters used in said depth-cueing process.

17. An image synthesizing method for performing a texture mapping, comprising the steps of:

computing texture coordinates for specifying information of a texture to be mapped on an object; and reading the texture information from texture information memory, wherein said texture information includes a process control flag for controlling at least one given process carried out based on said texture information.

18. An image synthesizing method for performing a texture mapping, comprising the steps of:

computing texture coordinates for specifying information of a texture to be mapped on an object; and reading the texture information from texture information memory, wherein said texture information includes a parameter switching flag for switching a parameter used in at least one given process which is performed based on said texture information.

* * * * *